(12) United States Patent
Heathman

(10) Patent No.: US 6,270,565 B1
(45) Date of Patent: Aug. 7, 2001

(54) METHODS AND COMPOSITIONS FOR CEMENTING PIPE IN WELL BORES

(75) Inventor: James F. Heathman, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/377,323

(22) Filed: Aug. 19, 1999

Related U.S. Application Data

(62) Division of application No. 09/153,650, filed on Sep. 15, 1998, now Pat. No. 5,996,693.

(51) Int. Cl.$^7$ .................................................. C04B 24/16
(52) U.S. Cl. ........................ 106/696; 106/725; 106/823
(58) Field of Search ................................... 106/696, 724, 106/725, 823

(56) References Cited

U.S. PATENT DOCUMENTS

| | | | |
|---|---|---|---|
| 3,844,351 | 10/1974 | Sutton et al. | 166/292 |
| 4,304,298 | 12/1981 | Sutton | 166/300 |
| 4,332,619 | * 6/1982 | Gandy et al. | |
| 4,333,764 | 6/1982 | Richardson | 106/87 |
| 4,466,833 | 8/1984 | Spangle | 106/88 |
| 4,470,727 | 9/1984 | Ritter | 405/267 |
| 4,537,918 | 8/1985 | Parcevaux et al. | 523/130 |
| 4,844,164 | 7/1989 | Shen | 166/291 |
| 5,035,813 | 7/1991 | Shen | 252/8.551 |
| 5,147,565 | 9/1992 | Bour et al. | 252/8.551 |
| 5,378,279 | * 1/1995 | Conroy | 106/719 |
| 5,389,706 | 2/1995 | Heathman et al. | 524/5 |
| 5,401,786 | 3/1995 | Gopalkrishnan | 524/5 |
| 5,529,123 | 6/1996 | Carpenter et al. | 166/293 |
| 5,688,844 | 11/1997 | Chatterji et al. | 524/8 |
| 5,806,594 | 9/1998 | Stiles et al. | 166/293 |

FOREIGN PATENT DOCUMENTS

| | | | |
|---|---|---|---|
| 50105719 | * | 8/1975 | (JP) . |
| 58060650 | * | 4/1983 | (JP) . |
| 62275049 | * | 11/1987 | (JP) . |

\* cited by examiner

*Primary Examiner*—Paul Marcantoni
(74) *Attorney, Agent, or Firm*—Craig W. Roddy; C. Clark Dougherty, Jr.

(57) ABSTRACT

Methods and compositions for cementing pipe strings in well bores are provided. The compositions are basically comprised of a hydraulic cement, water, an in situ foam generating additive and a water-wetting foam stabilizing surfactant.

22 Claims, No Drawings

METHODS AND COMPOSITIONS FOR CEMENTING PIPE IN WELL BORES

Related U.S. Application Data

This is a divisional of application Ser. No. 09/153,650 filed on Sep. 15, 1998, now U.S. Pat. No. 5,996,693.

BACKGROUND OF THE INVENTION

1. Field of the Invention

The present invention relates generally to improved methods and compositions for cementing pipe in well bores.

2. Description of the Prior Art

Hydraulic cement compositions are commonly utilized in primary sealing operations whereby strings of pipe such as casing and liners are sealed in well bores. In performing primary cementing, a hydraulic cement composition is pumped into the annular space between the walls of the well bore and the exterior surfaces of the pipe desposed therein. The cement composition is permitted to set in the annular space thereby forming an annular sheath of hardened substantially impermeable cement therein. The sheath physically supports and positions the pipe in the well bore and is intended to bond the exterior surfaces of the pipe to the walls of the well bore whereby the undesirable migration of fluids between zones or formations penetrated by the well bore is prevented.

In a deep, high temperature well bore penetrating weak formations, the cementing of a pipe string in the well bore is often difficult and characterized by lost circulation during cementing and gas migration through the resulting cement sheath. These problems are principally caused by the use of a cement slurry having insufficient fluid loss control and using an aqueous spacer between the drilling fluid and the cement slurry which does not adequately remove drilling fluid from the pipe surfaces and the walls of the well bore. Further, at the high temperatures encountered, when an oil based drilling fluid is used and the aqueous spacer mixes with oil on the walls of the well bore, solidification of the mixture often results. The presence of drilling fluid and/or solidified oil-water mixtures in the well bore prevents the cement slurry from adequately bonding to the pipe and walls of the well bore, and as a consequence, costly remedial cementing procedures are required.

Thus, there are needs for improved methods and compositions for cementing pipe strings in well bores drilled using oil based drilling fluids.

SUMMARY OF THE INVENTION

The present invention provides methods and compositions for cementing pipe in well bores which meet the needs described above and overcome the deficiencies of the prior art. The methods of the invention basically comprise the steps of preparing a cement composition comprised of hydraulic cement, water, an in situ foam generating additive and a water-wetting foam stabilizing surfactant; placing the cement composition in the annulus between the exterior surfaces of a pipe string and the walls of the well bore whereby the surfactant causes drilling fluid in the well bore to be displaced therefrom and causes the pipe surfaces and walls of the well bore to be water-wetted whereby the cement composition will readily bond thereto; and then allowing the cement composition to foam and set in the annulus. The surfactant in the cement composition also facilitates and stabilizes the foaming of the cement composition which in turn helps prevent the migration of gas into and through the cement composition.

The compositions of this invention are basically comprised of a hydraulic cement, water in an amount sufficient to form a pumpable slurry, an in situ foam generating additive and a water-wetting foam stabilizing surfactant. The in situ foam generating additive causes a gas to be formed within the cement compositions which foams the compositions prior to when they set and, as mentioned, the surfactant in the cement compositions water wets the pipe and well bore surfaces, facilitates the formation of foam and stabilizes the foam.

It is, therefore, a general object of the present invention to provide improved methods and compositions for cementing pipe strings in well bores.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods and compositions for cementing a pipe string in a well bore, and particularly in such a well bore which is deep, has a high bottom hole temperature, penetrates weak formations having high potential for gas flow into the well bore and was drilled using an oil based drilling fluid.

In accordance with the methods of the present invention, a cement composition is prepared comprised of hydraulic cement, water, an in situ foam generating additive and a water-wetting foam stabilizing surfactant. The cement composition is placed in the annulus between the exterior surfaces of a pipe string and the walls of a well bore in which the pipe string is disposed, and the cement composition is allowed to foam and set therein.

The in situ foam, generating additive in the cement composition produces a gas which foams the cement composition during and after its placement in the annulus. The water-wetting foam stabilizing surfactant in the cement composition facilitates the generation of the foam and stabilizes it. In addition, the surfactant functions to cause oil on the pipe surfaces and the walls of the well bore to be removed and the surfaces and walls to be made water-wet whereby good bonding between the cement composition and the surfaces and walls results.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high alumina content cements, silica cements and high alkalinity cements. Portland cements are generally preferred for use in accordance with the present invention, and Portland cements of the types defined and described in *API Specification For Materials And Testing For Well Cements*, API Specification 10, 5th Edition, dated Jul. 1, 1990 of the American Petroleum Institute are particularly preferred. API Portland cements include classes A, B, C, G and H, with API classes G and H being more preferred and class H being the most preferred.

The water utilized in the compositions of this invention can be from any source provided it does not contain an excess of compounds that adversely affect other components in the cement compositions. For example, the water can contain various salts such as sodium, potassium, calcium chloride or the like. Generally, the water is present in a cement composition of this invention in an amount sufficient to form a pumpable slurry. More particularly, the water is generally present in the cement compositions of this invention in an amount in the range of from about 35% to about 55% by weight of hydraulic sement therein (from about 4 to about 6.2 gallons per sack).

While various in situ foam generating additives can be utilized, aluminum powder or aluminum powder coated with a dispersing surfactant is preferably utilized. When added to an aqueous cement composition, aluminum powder delayedly generates hydrogen gas in the cement composition which causes it to foam during and after placement. The foam generating agent is included in the cement compositions of this invention in a general amount in the range of from about 0.1% to about 1% by weight of hydraulic cement in the composition (about 0.1 pounds per sack to about 1 pound per sack), preferably in the range of from about 0.2% to about 0.7% (about 0.2 pounds per sack to about 0.66 pounds per sack), and more preferably about 0.5% (about 0.47 pounds per sack).

While various surfactants can be included in the cement compositions of the present invention for facilitating the removal of water based and oil based drilling fluids and filter cake from pipe and well bore and leaving them water wet surfaces and/or for facilitating and stabilizing the in situ foam formed in the cement composition, a single water-wetting foam stabilizing surfactant is preferably utilized. Such a surfactant which is preferred for use in accordance with the present invention is an anionic surfactant comprised of an ethoxylated alkali metal salt of an alkylpolyether sulfonic acid. The alkyl substituents of the ethoxylated alkylpolyether sulfonate preferably contain from about 12 to about 15 carbon atoms and the alkylpolyether sulfonate is preferably ethoxylated within the range of from about 2 moles to about 50 moles of ethylene oxide per mole thereof. The ethoxylated alkylpolyether sulfonate is dissolved in an aqueous solvent in an amount in the range of from about 20 parts to about 40 parts per 100 parts by weight of the solution. The most preferred water-wetting foam stabilizing surfactant for use in accordance with this invention is comprised of a sodium alkylpolyether sulfonate ethoxylated with an average of about 15 moles of ethylene oxide per mole dissolved in an aqueous solvent in an amount of about 33 parts per 100 parts by weight of the solution. Such an aqueous surfactant solution is commercially available under the trade designation "STABILIZER 434C™" from Halliburton Energy Services of Duncan, Okla. Other less preferred surfactants which can be used include, but are not limited to, surfactants comprised of a sulfonated linear alcohol ethoxylate, an ethoxylated nonyl phenol and a cocoamidobetaine.

The water-wetting and foam stabilizing surfactant is generally included in a cement composition of this invention in an amount within the range of from about 0.5% to about 7% by weight of hydraulic cement in the composition (about 0.05 gallons per sack to about 0.75 gallons per sack), preferably in an amount in the range of from about 0.5% to about 5.7% (about 0.05 gallons per sack to about 0.6 gallons per sack), and more preferably about 4.3% (about 0.45 gallons per sack).

A preferred cement composition of this invention for cementing a pipe string in a well bore drilled using an oil based drilling fluid is comprised of a hydraulic cement, preferably Portland cement; water in an amount sufficient to form a pumpable slurry; an in situ foam generating additive, preferably aluminum powder, present in an amount in the range of from about 0.2% to about 0.7% by weight of hydraulic cement in the composition; and a water-wetting foam stabilizing surfactant, preferably the above described sodium alkylpolyether sulfonate surfactant, present in an amount in the range of from about 0.5% to about 5.7% by weight of hydraulic cement in the composition.

A particularly preferred cement composition of this invention is comprised of Portland API Class H cement; water present in an amount of about 40% by weight of hydraulic cement in the composition; aluminum powder present in an amount of about 0.5% by weight of hydraulic cement in the composition; and a sodium alkylpolyether sulfonate ethoxylated with an average of about 15 moles of ethylene oxide per mole present in an amount of about 4.3% by weight of hydraulic cement in the composition.

The cement compositions of this invention preferably also include other additives commonly utilized in cement compositions and which are well known to those skilled in the art. For example, the compositions can include compressive strength retrogression control additives comprised of powdered crystalline silica, one or more weighting materials, fluid loss control additives and set retarders. A preferred fluid loss control additive is a graft lignin or lignite polymer commercially available under the trade designation "HALAD™413" from Halliburton Energy Services of Duncan, Okla. The fluid loss control additive is generally included in a cement composition of this invention in an amount in the range of from about 0.1% to about 1% by weight of hydraulic cement in the composition. A preferred set retarding additive for use in accordance with this invention is comprised of a copolymer of 2-acrylamido-2-methylpropane sulfonic acid and acrylic acid commercially available under the trade designation "SCR-100™" from Halliburton Energy Services and a set retarder intensifier comprised of tartaric acid commercially available under the trade designation "HR-25™" from Halliburton Energy Services.

As mentioned above, the methods of this invention are comprised of the steps of preparing a cement composition of this invention, placing the cement composition in the annulus between the exterior surfaces of a string of pipe disposed in a well bore and the walls of the well bore and then allowing the cement composition to foam and set in the annulus.

As also mentioned above, because aqueous spacer fluids utilized between an oil based drilling fluid and a cement composition in a well bore often cause the aqueous spacer fluid-oil based drilling fluid mixtures formed to solidify at high well bore temperatures, a spacer comprised of an oil external-water internal emulsion is preferably utilized in accordance with this invention. That is, an oil external-water internal emulsion spacer is placed in the annulus immediately preceding the placement of the cement composition of this invention. The emulsion spacer fluid functions to separate the oil based drilling fluid from the cement composition, but it does not remove oil from the pipe surfaces and well bore walls. The removal of such oil is accomplished by the water-wetting foam stabilizing surfactant included in the cement compositions of the present invention which also leaves the pipe and well bore wall surfaces water-wet whereby a good bond between the set cement composition and the pipe and well bore wall surfaces results.

In order to further illustrate the methods and compositions of this invention, the following example is given.

EXAMPLE

A 5" liner string was cemented in a 19,200' well bore drilled with an 18 lb. oil (diesel) based drilling fluid. The bottom hole static temperature of the well was 400° F. and the bottom hole circulating temperature was 339° F.

In performing the liner cementing job, a cement composition of the present invention was prepared, placed in the annulus between the well bore and liner and allowed to foam and set therein. An oil external-water internal spacer was used ahead of the cement composition. The cement composition was comprised of Texas Lehigh API Class H Portland cement, fresh water present in an amount of about 41% by weight of cement in the composition (about 4.62 gallons per sack), an in situ foam generating additive comprised of aluminum powder present in an amount of about 0.5% by weight of cement in the composition (about 0.47 pounds per sack) and a water-wetting foam stabilizing surfactant comprised of an aqueous solution of an ethoxylated sodium alkylpolyether sulfonate (Halliburton "STABILIZER 434C™") present in an amount of about 2.4% by weight of cement in the composition (about 0.25 gallons per sack). In addition, a strength retrogression control additive comprised of powdered crystalline silica was included in the composition in an amount of about 35% by weight of cement therein (about 37 pounds per sack) along with a hematite weighting material present in an amount of about 32% by weight of cement (about 30 pounds per sack), a graft lignin or lignite polymer fluid loss control agent (Halliburton "HALAD™ 413") present in an amount of about 0.7% by weight of cement (about 0.66 pounds per sack), a set retarder comprised of a copolymer of 2-acrylamido-2-methylpropane sulfonic acid and acrylic acid (Halliburton "SCR-100™") present in an amount of about 1.6% by weight of cement (about 1.5 pounds per sack) and a set retarder intensifier comprised of tartaric acid (Halliburton "HR-25™") present in an amount of 0.8% by weight of cement (about 0.75 pounds per sack).

The above composition was run in the annulus between the liner and the well bore until 200 sacks of the hydraulic cement had been used at which time additional cement without the surfactant was run to complete the job.

The liner was found to have an exceptional bond log and it was the first deep, high temperature well in the area that the operator was able to complete without having to do considerable remedial cementing.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising:
   a hydraulic cement;
   water in an amount sufficient to form a pumpable slurry;
   an in situ foam generating additive present in an amount in the range of from about 0.1% to about 1% by weight of hydraulic cement in said composition; and
   a water-wetting foam stabilizing surfactant present in an amount in the range of from about 0.5% to about 7% by weight of hydraulic cement in said composition.

2. The composition of claim 1 wherein said water is present in said composition in an amount in the range of from about 35% to about 55% by weight of hydraulic cement in said composition.

3. The composition of claim 1 wherein said hydraulic cement comprises Portland cement.

4. The composition of claim 1 wherein said in situ foam generating additive comprises aluminum powder.

5. The composition of claim 1 wherein said water-wetting foam stabilizing surfactant is an anionic surfactant comprising an ethoxylated alkali metal salt of an alkylpolyether sulfonic acid.

6. The composition of claim 1 wherein said water-wetting foam stabilizing surfactant is an ethoxylated alkali metal salt of an alkylpolyether sulfonate wherein the alkyl substituents contain from about 12 to about 15 carbon atoms and the alkylpolyether sulfonate contains in the range of from about 2 moles to about 50 moles of ethylene oxide per mole.

7. The composition of claim 1 further comprising a fluid loss control additive.

8. The composition of claim 7 wherein said fluid loss control additive comprises a graft lignin or lignite polymer.

9. The composition of claim 1 further comprising a set retarding additive.

10. The composition of claim 9 wherein said set retarding additive comprises a copolymer of 2-acrylamido-2-methylpropane sulfonic acid and acrylic acid and a set retarder intensifier comprising tartaric acid.

11. The composition of claim 1 further comprising a compressive strength retrogression control additive.

12. The composition of claim 11 wherein said compressive strength retrogression control additive comprises crystalline silica.

13. A cement composition for cementing a pipe string in a well bore comprising:
   a hydraulic cement;
   water in an amount sufficient to form a pumpable slurry;
   aluminum powder present in an amount in the range of from about 0.1% to about 1% by weight of hydraulic cement in said composition; and
   a water-wetting foam stabilizing surfactant present in an amount in the range of from about 0.5% to about 7% by weight of hydraulic cement in said composition.

14. The composition of claim 13 wherein said water-wetting foam stabilizing surfactant is an anionic surfactant comprising an ethoxylated alkali metal salt of an alkylpolyether sulfonic acid.

15. The composition of claim 13 wherein said water-wetting foam stabilizing surfactant is an ethoxylated alkali metal salt of an alkylpolyether sulfonate wherein the alkyl substituents contain from about 12 to about 15 carbon atoms and the alkylpolyether sulfonate contains in the range of from about 2 moles to about 50 moles of ethylene oxide per mole.

16. The composition of claim 13 further comprising a fluid loss control additive.

17. The composition of claim 16 wherein said fluid loss control additive comprises a graft lignin or lignite polymer.

18. The composition of claim 13 further comprising a set retarding additive.

19. The composition of claim 18 wherein said set retarding additive comprises a copolymer of 2-acrylamido-2-methylpropane sulfonic acid and acrylic acid and a set retarder intensifier comprising tartaric acid.

20. The composition of claim 13 further comprising a compressive strength retrogression control additive.

21. The composition of claim 20 wherein said compressive strength retrogression control additive comprises crystalline silica.

22. A cement composition for cementing a pipe string in a well bore comprising:
   Portland cement;
   water in an amount sufficient to form a pumpable slurry;
   aluminum powder present in an amount in the range of from about 0.1% to about 1% by weight of hydraulic cement in said composition; and
   an anionic surfactant comprising an ethoxylated alkali metal salt of an alkylpolyether sulfonic acid present in an amount in the range of from about 0.5% to about 7% by weight of cement in said composition.

* * * * *